(12) United States Patent
Becker et al.

(10) Patent No.: US 11,740,836 B2
(45) Date of Patent: Aug. 29, 2023

(54) PARALLEL READS OF DATA STAGING TABLE

(71) Applicant: SAP SE, Walldorf (DE)

(72) Inventors: Alexander Becker, Mühlhausen (DE); Sebastian Haase, Kronau (DE); Michael Haberkorn, Bad Schönborn (DE); Dennis Alexander Gauss, Bruchsal (DE)

(73) Assignee: SAP SE, Walldorf (DE)

( * ) Notice: Subject to any disclaimer, the term of this patent is extended or adjusted under 35 U.S.C. 154(b) by 108 days.

(21) Appl. No.: 17/393,562

(22) Filed: Aug. 4, 2021

(65) Prior Publication Data

US 2023/0044115 A1 Feb. 9, 2023

(51) Int. Cl.
*G06F 3/00* (2006.01)
*G06F 3/06* (2006.01)
*G06F 16/23* (2019.01)

(52) U.S. Cl.
CPC .......... *G06F 3/0659* (2013.01); *G06F 3/0604* (2013.01); *G06F 3/0652* (2013.01); *G06F 3/0679* (2013.01); *G06F 16/2336* (2019.01); *G06F 16/2379* (2019.01)

(58) Field of Classification Search
CPC ............. G06F 16/2379; G06F 16/2336; G06F 3/0659; G06F 3/0604; G06F 3/0652; G06F 3/0679
USPC ........................................................ 707/615
See application file for complete search history.

(56) References Cited

U.S. PATENT DOCUMENTS

| | | | | |
|---|---|---|---|---|
| 2001/0044834 | A1* | 11/2001 | Bradshaw ............. | G06F 16/958 709/213 |
| 2003/0233370 | A1* | 12/2003 | Barabas .............. | G06F 16/2308 707/999.103 |
| 2004/0267807 | A1* | 12/2004 | Barabas .............. | G06F 16/2379 707/999.103 |
| 2020/0242710 | A1* | 7/2020 | Krovvidi ................. | G06F 16/93 |

* cited by examiner

*Primary Examiner* — Vincent F Boccio
(74) *Attorney, Agent, or Firm* — Buckley, Maschoff & Talwalkar LLC

(57) ABSTRACT

Systems and methods to read records of a data staging table, where each record of the data staging table is associated with a package identifier, a key value of a record of a first database table, values of one or more non-key fields of the record of the first database table, and a database operation, include reading of one or more records of the data staging table, each of the read one or more records associated with a package identifier indicating the record is not being processed, and not including a same key value as any other record of the data staging table associated with a package identifier indicating the record is being processed, updating the package identifier of each of the read records of the data staging table to a first package identifier indicating that the record is being processed, creating a transaction record of a transaction queue associating the data staging table and the first package identifier, determining that the read one or more records have been processed, and, in response to the determination, deleting the one or more read rows from the data staging table and the transaction record.

18 Claims, 9 Drawing Sheets

| Sequence | Package | Key | Non-Key Fields | Operation |
|---|---|---|---|---|
| • • • | | | | |
| Sequence 6 | Package 0 | Key 1 | ~~~~~ | ~~~~~ |
| Sequence 5 | Package 0 | Key 4 | ~~~~~ | ~~~~~ |
| Sequence 4 | Package 0 | Key 1 | ~~~~~ | ~~~~~ |
| Sequence 3 | Package 0 | Key 3 | ~~~~~ | ~~~~~ |
| Sequence 2 | Package 0 | Key 2 | ~~~~~ | ~~~~~ |
| Sequence 1 | Package 0 | Key 1 | ~~~~~ | ~~~~~ |

| Sequence | Package | Key | Non-Key Fields | Operation |
|---|---|---|---|---|

• • •

| Sequence 6 | Package 0 | Key 1 | ~~~~~~ | ~~~~~~ |
| Sequence 5 | Package 0 | Key 4 | ~~~~~~ | ~~~~~~ |
| Sequence 4 | Package 1 | Key 1 | ~~~~~~ | ~~~~~~ |
| Sequence 3 | Package 1 | Key 3 | ~~~~~~ | ~~~~~~ |
| Sequence 2 | Package 1 | Key 2 | ~~~~~~ | ~~~~~~ |
| Sequence 1 | Package 1 | Key 1 | ~~~~~~ | ~~~~~~ |

| Table ID | Package ID | Status |
|---|---|---|
| Table 1 | Package 1 | In-process |

| Sequence | Package | Key | Non-Key Fields | Operation |
|---|---|---|---|---|
| ... | | | | |
| Sequence 6 | Package 0 | Key 1 | ~~~~~ | ~~~~~ |
| Sequence 5 | Package 2 | Key 4 | ~~~~~ | ~~~~~ |
| Sequence 4 | Package 1 | Key 1 | ~~~~~ | ~~~~~ |
| Sequence 3 | Package 1 | Key 3 | ~~~~~ | ~~~~~ |
| Sequence 2 | Package 1 | Key 2 | ~~~~~ | ~~~~~ |
| Sequence 1 | Package 1 | Key 1 | ~~~~~ | ~~~~~ |

| Table ID | Package ID | Status |
|---|---|---|
| Table 1 | Package 1 | In-process |
| Table 1 | Package 2 | In-process |

| Sequence | Package | Key | Non-Key Fields | Operation |
|---|---|---|---|---|

• • •

| Sequence 6 | Package 0 | Key 1 | ~~~~~ | ~~~~~ |
|---|---|---|---|---|
| Sequence 4 | Package 1 | Key 1 | ~~~~~ | ~~~~~ |
| Sequence 3 | Package 1 | Key 3 | ~~~~~ | ~~~~~ |
| Sequence 2 | Package 1 | Key 2 | ~~~~~ | ~~~~~ |
| Sequence 1 | Package 1 | Key 1 | ~~~~~ | ~~~~~ |

| Table ID | Package ID | Status |
|---|---|---|
| Table 1 | Package 1 | In-process |

| Sequence | Package | Key | Non-Key Fields | Operation |
|---|---|---|---|---|

• • •

| Sequence 6 | Package 0 | Key 1 | ~~~~~ | ~~~~~ |

| Table ID | Package ID | Status |
|---|---|---|

| Sequence | Package | Key | Non-Key Fields | Operation |
|---|---|---|---|---|
| • • • | | | | |
| Sequence 6 | Package 0 | Key 1 | ~~~~~ | ~~~~~ |
| Sequence 5 | Package 0 | Key 4 | ~~~~~ | ~~~~~ |
| Sequence 4 | Package 0 | Key 1 | ~~~~~ | ~~~~~ |
| Sequence 3 | Package 1 | Key 3 | ~~~~~ | ~~~~~ |
| Sequence 2 | Package 1 | Key 2 | ~~~~~ | ~~~~~ |
| Sequence 1 | Package 1 | Key 1 | ~~~~~ | ~~~~~ |

| Table ID | Package ID | Status |
|---|---|---|
| Table 1 | Package 1 | Open |

| Sequence | Package | Key | Non-Key Fields | Operation |
|---|---|---|---|---|
| • • • | | | | |
| Sequence 6 | Package 0 | Key 1 | ~~~~~ | ~~~~~ |
| Sequence 5 | Package 2 | Key 4 | ~~~~~ | ~~~~~ |
| Sequence 4 | Package 0 | Key 1 | ~~~~~ | ~~~~~ |
| Sequence 3 | Package 1 | Key 3 | ~~~~~ | ~~~~~ |
| Sequence 2 | Package 1 | Key 2 | ~~~~~ | ~~~~~ |
| Sequence 1 | Package 1 | Key 1 | ~~~~~ | ~~~~~ |

| Table ID | Package ID | Status |
|---|---|---|
| Table 1 | Package 1 | Open |
| Table 1 | Package 2 | Open |

*FIG. 16*

PARALLEL READS OF DATA STAGING TABLE

BACKGROUND

Conventional database systems store large volumes of data related to many aspects of an enterprise. It is often desirable to transfer data from a source database system to a target database system. For example, it may be desirable to transfer data from a source system which is particularly suited for data acquisition to a target system which is particularly suited for data analysis.

In some systems, a producer job extracts changes to data (i.e., deltas) from a source system and sends the extracted data changes to a consumer job at a target system. The extracted data changes may be transferred to the target system via a package (also referred to as a transaction). To ensure data consistency between the source system and target system, the target system applies received packages, in order of creation, to its corresponding stored data.

In prior architectures, a producer job waits to receive a notification that a consumer job has successfully processed a transferred package before processing a new package. While the producer job waits for the notification from the consumer job, the source system and target system lock their respective persistent storages to ensure data consistency between the source system and the target system. This waiting reduces data throughput. Moreover, the locking process prevents multiple consumer jobs from operating in parallel with respect to same source data.

Some systems use a staging table to bypass the above-described bottlenecks. Generally, a producer job of a source system writes packages to the staging table without knowledge of any consumer jobs which might read the package therefrom, and continues to write packages without waiting for feedback from any consumer job. Similarly, a consumer job of a target system reads packages from the staging table without knowledge of the producer jobs which wrote the packages thereto. This approach improves throughput and also facilitates parallelization. For example, a source system may store packages using multiple execution threads and a target system may read packages using the same number or a different number of execution threads.

At a given time, the staging table may store several packages associated with the same table key value but which were inserted into the staging table at different times. The later-inserted packages may include values of non-key fields which have been updated with respect to the values of earlier-inserted packages. Accordingly, to ensure that the changes are applied at a target system correctly, all packages associated with a same table key value should arrive at a target system in chronological order.

Current systems address this requirement by associating a given key value with a single consumer job. All other consumer jobs are prevented from reading packages from the staging table which are associated with this key value. In some implementations, a consumer job may be associated with specified ranges or hash buckets of key field values. This approach and its different implementations require manual configuration by an expert user and reduce throughput by limiting system parallelism.

BRIEF DESCRIPTION OF THE DRAWINGS

FIG. 2 is a tabular representation of a staging table according to some embodiments.

FIG. 4 is a tabular representation of a staging table according to some embodiments.

FIG. 5 is a tabular representation of a transaction queue according to some embodiments.

FIG. 6 is a tabular representation of a staging table according to some embodiments.

FIG. 7 is a tabular representation of a transaction queue according to some embodiments.

FIG. 8 is a tabular representation of a staging table according to some embodiments.

FIG. 9 is a tabular representation of a transaction queue according to some embodiments.

FIG. 10 is a tabular representation of a staging table according to some embodiments.

FIG. 11 is a tabular representation of a transaction queue according to some embodiments.

FIG. 13 is a tabular representation of a staging table according to some embodiments.

FIG. 14 is a tabular representation of a transaction queue according to some embodiments.

FIG. 15 is a tabular representation of a staging table according to some embodiments.

FIG. 16 is a tabular representation of a transaction queue according to some embodiments.

DETAILED DESCRIPTION

The following description is provided to enable any person in the art to make and use the described embodiments. Various modifications, however, will remain readily-apparent to those in the art.

Some embodiments provide parallel consumption of packages within a staging table associated with a database object. Generally, parallel processing is provided by allowing consumer jobs to process only packages which are associated with a table key value for which no other packages are currently being processed.

Figure 1:
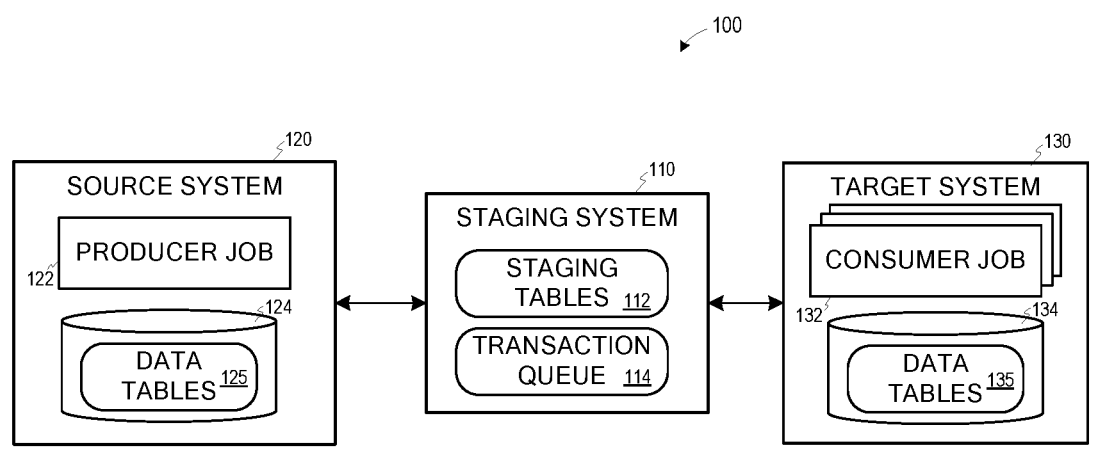
FIG. 1 is an architecture of a system to provide data from a source system to a target system according to some embodiments.

FIG. 1 illustrates system 100 according to some embodiments. Staging system 110 allows target system 130 to receive changes to objects stored in source system 120 which decoupling target system 130 from source system 120. Although FIG. 1 illustrates one source system and one target system, in some embodiments staging system 110 may allow consumption of data from any number of source systems to any number of target systems.

Each of source system 120 and target system 130 may comprise any computing system capable of executing a database management system, of storing and independently managing data of one or more tenants and, in some embodiments, of supporting the execution of database server applications. Each of source system 120 and target system 130 may include a distributed storage system and/or distributed server nodes for performing computing operations as is known in the art. One or more components of source system 120 and/or target system 130 may be implemented by cloud computing resources.

According to some embodiments, source system 120 is an on-premise transactional database system and target system 130 is an in-memory database system configured to provide data analytics, but embodiments are not limited thereto. A client application (not shown) may communicate with one or more server applications (not shown) executing on target system 130 to perform data analytics on data stored in tables 134.

Source system 120 and target system 130 may implement an in-memory database, in which a full database is stored in volatile (e.g., non-disk-based) memory (e.g., Random Access Memory). The full database may be persisted in and/or backed up to fixed disks (not shown). Embodiments are not limited to in-memory implementations. For example, source system 120 and target system 130 may store data in Random Access Memory (e.g., cache memory for storing recently-used data) and one or more fixed disks (e.g., persistent memory for storing their respective portions of the full database).

Source system 120 includes processor-executable program code of producer job 122. Producer job 122 collects changes to data tables 125 of persistent storage 124 and transmits the changes (e.g., via an Application Programming Interface) to staging system 110 for storage in staging tables 112. Each staging table 112 of staging system 110 may correspond to one database object (e.g., table, view) represented within data tables 124. Producer job 122 may transmit changes of only those database objects to which staging system 110 subscribes (via a configuration or the like).

Target system 130 includes processor-executable program code of consumer jobs 132. Embodiments are not limited to any particular number of consumer jobs 132. Each of consumer jobs 132 reads records of staging tables 112 as described below and applies data changes described by the read records to data tables 135. Selected database objects of source system 120 may therefore be replicated in target system 130. Advantageously, source system 120 may be unaware of target system 130 and of any other target system which replicates data objects of source system 120. Similarly, target system 130 need not perform any monitoring, synchronization, or acknowledgement processes with respect to source system 120.

Staging system 110 may comprise any combination of hardware and processor-executable program code, including but not limited to a virtual server. Staging system 110 receives the data changes from source system 120, constructs packages therefrom, and stores the packages in corresponding ones of staging tables 112. For example, a transaction within source system 120 may update several non-key fields of a particular record of a particular data table 125, where the record is associated with a unique key value of the data table 125. Producer job 122 transmits the changes to staging system 110, which stores the changes within a record of a staging table 112 corresponding to the data table 125.

In some embodiments, producer job 122 "pushes" the changes to staging system 110 via a synchronous call. In some other embodiments, the changes are "pulled" from producer job 122 by staging system 110. For example, staging system 110 may poll producer job 122 for new data associated with one or more database objects of interest.

FIG. 2 is a tabular representation of a portion of staging table 200 according to some embodiments. Staging table 200 is associated with a single database object in some embodiments. Each record represents a data change collected by staging system 110 for the associated database object. Each record of staging table 200 includes a key of the database object, one or more non-key fields, an operation type associated with the data change (e.g., Insert, Update, Delete), a sequence ID, and a package ID.

The sequence ID indicates the temporal order of the data change with respect to other data changes received from producer job 122. The sequence IDs may be used to ensure that the collected data changes are applied in the correct order. The sequence IDs may comprise monotonically increasing numbers, timestamps, or any other suitable data.

The package ID assigns the record to a particular package. Upon storage of a record in staging table 200, the record is assigned a package ID (e.g., 0) which indicates that the data change is not yet assigned to any package. As will be described below, consumer jobs may manipulate the package IDs to facilitate parallel package processing according to some embodiments.

Figure 3:
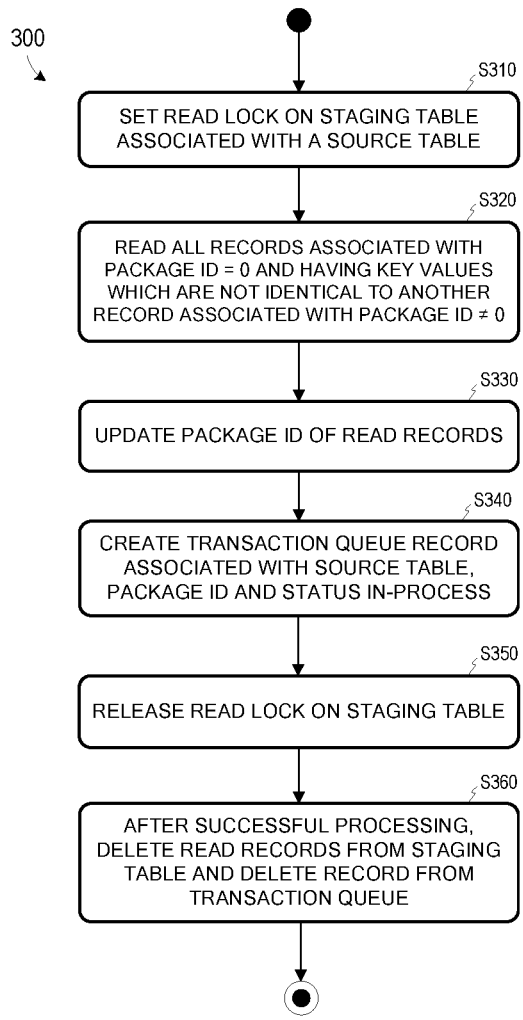
FIG. 3 is a flow diagram of a process performed by a consumer job according to some embodiments.

FIG. 3 is a flow diagram of process 300 to read records of a staging table according to some embodiments. Process 300 may be executed in parallel by each consumer job 132 of target system 130 to read records of staging tables 112 of staging system 112 according to some embodiments.

Process 300 and the other processes described herein may be performed using any suitable combination of hardware and software. Program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

It will be assumed that a target system is associated with one or more particular staging tables corresponding to one or more particular database objects. For example, staging system 110 may be configured to associate target system 130 with a particular staging table 112 that is in turn associated with a particular database object of source system 120 which target system 130 intends to replicate. Target system 130 may be associated with other staging tables, and other target systems may be associated with the staging tables 112 with which target system 130 is associated.

It will also be assumed that, prior to S310, a first consumer job 132 is initiated to read data changes of the particular staging table in order to perform replication within target system 130. Accordingly, at S310, the consumer job 132 instructs staging system 110 to set a read lock on the staging table. The read lock prevents all other consumer jobs 132 from reading the staging table.

Next, at S320, the consumer job 132 reads, in order of sequence ID, all records of the staging table having package ID=0 and which are associated with key values that are not identical to any other record having a non-zero package ID. The following SQL query provides one example of an implementation of the read operation at S320:

```
select * from <staging> as pkg
up to <max_records> records
where package_id = 0 and
    not exists ( select * from <staging> as pkg_check
        where package_id > 0 and
            pkg.<key_field1> = pkg_check.<key_field1> and
            pkg.<key_field2> = pkg_check.<key_field2>....)
order by sequence
```

For purposes of the present example, it will also be assumed that the maximum number of records which may be read by a consumer job is four. With reference to staging table 200 of FIG. 2, the records associated with sequence IDs 1-4 are therefore read at S320.

The package ID of the records read at S320 is updated at S330. The updated package ID is a unique ID, such as a monotonically increasing number. FIG. 4 shows staging table 200 after S320 according to the present example, with the read records now being associated with package ID=1.

A new record of a transaction queue such as transaction queue 114 is created at S340. The created transaction record is associated with the source table, the updated package ID and the status "in-process". FIG. 5 is a tabular representation of a portion of transaction queue 500 according to some embodiments. Transaction queue 500 includes a single record created at S340 according to the present example. The record identifies a database table (i.e., Table 1) associated with staging table 200, the package ID of the read records, and the status "in-process".

The read lock on the staging table is released at S350, thereby allowing other consumer jobs from the same or different target system to read staging table 200. The present consumer job/target system then performs any desired processing based on the read records. At some point, and using any mechanisms that are or become known, the consumer job/target system may determine that the records have been successfully processed. In response to such a determination, at S360, the records are deleted from the staging table and the record created at S340 is deleted from the transaction queue.

It will be assumed that, after execution of S350 and prior to execution of S360 by the first consumer job 132, a second consumer job executes process 300 in parallel to read records of staging table 200. The second consumer job sets a read lock at S310 as described above and, at S320, reads all records associated with package ID=0 and which have key values that are not identical to another record having a package ID different from 0. The package IDs of the read records are updated at S330.

For example, FIG. 6 shows staging table 200 after reading of records thereof by a second consumer job at S320. As shown, the record associated with sequence ID=5 has been read and its package ID updated to 2. The record associated with sequence ID=6 is not read because, although its package ID=0, its key value (i.e., 1) is identical to another record (specifically, the records associated with sequence IDs 1 and 4) which is associated with a non-zero package ID. By avoiding reading of the record associated with sequence ID=6, embodiments may ensure that changes to specific records are processed in chronological order while allowing parallel processing of other changes. A record corresponding to the read records is then created in the transaction queue at S340, as shown in FIG. 7.

Assuming that the second consumer job 132 finishes processing the read records prior to the first job 132, the record associated with sequence ID=5 and the corresponding record of transaction queue 500 are deleted at S360. FIGS. 8 and 9 show resulting staging table 200 and transaction queue 500. Next, the first consumer job 132 completes processing of its read records, the records are deleted from staging table 200, and the transaction queue record associated with package ID=1 is deleted from transaction queue 500, as shown in FIGS. 10 and 11. Accordingly, a next consumer job 132 would read the record associated with sequence ID=6 from staging table 200.

Figure 12:
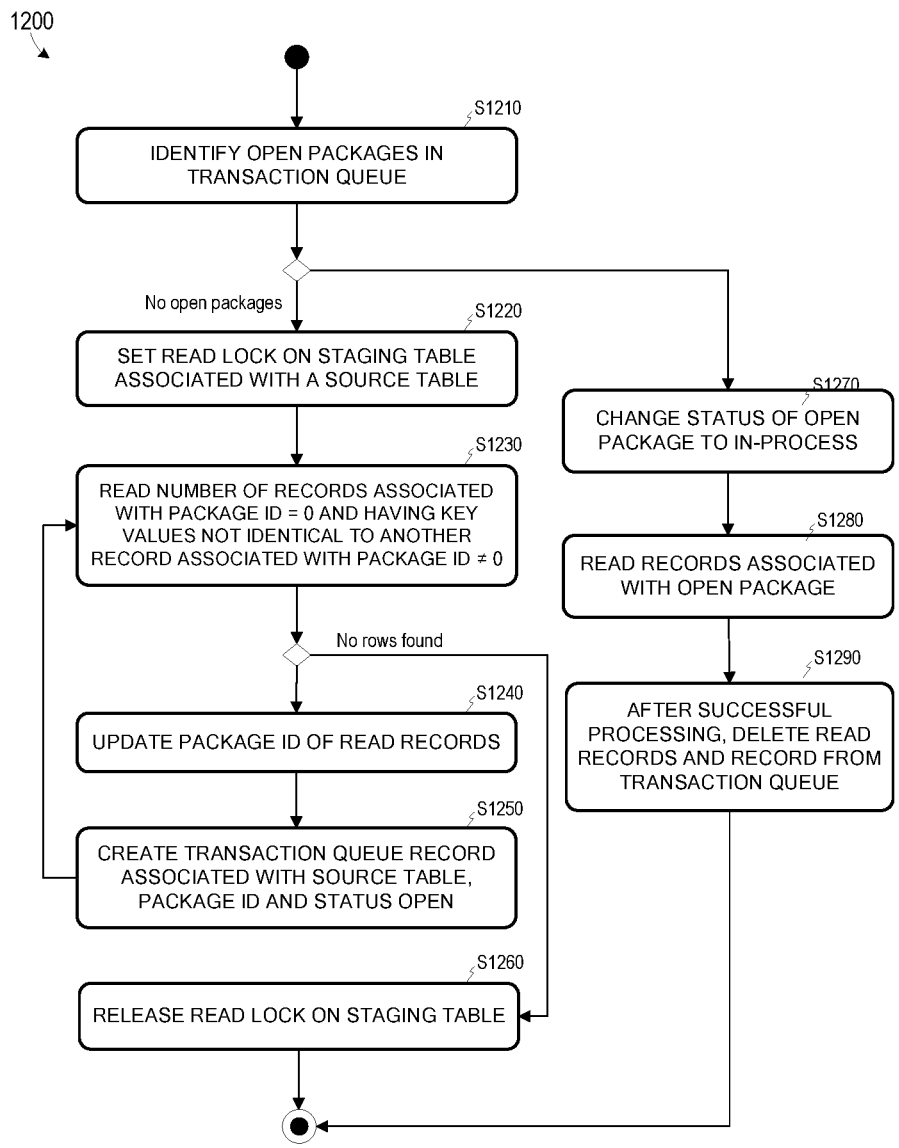
FIG. 12 is a flow diagram of a process performed by a consumer job according to some embodiments.

The read lock of process 300 may cause collisions between consumer jobs which attempt to read the staging table in parallel with one another. Such collisions may be particularly problematic if the staging table is large and each consumer job reads many records therefrom. FIG. 12 illustrates process 1200 to alleviate these collisions according to some embodiments. Process 1200 may be performed in parallel by a plurality of consumer jobs executing within a target system.

At S1210, it is determined whether a transaction queue includes any records representing a package having a status of "open". It will be assumed that process 1200 is being executed by a first-initiated consumer job upon staging table 200 of FIG. 2, and that no transaction queue records currently exist. Accordingly, flow proceeds to S1220 to set a read lock on staging table 200, which corresponds to a subject table of a source system 120. No other consumer job is able to read staging table 200 while the first consumer job possesses the lock.

A number of records of the staging table are read at S1230. As described with respect to S320 of process 300, the read records are associated with package ID=0 but do not include records having identical key values to records which are associated with non-zero package IDs. The number of records which are read may be any predetermined number (e.g., maximum 10,000 records), any calculated number (e.g., total number of records/number of consumer jobs), or any other suitable number.

For purposes of the present example, it will be assumed that the maximum number of records is three, and that the records corresponding to sequence IDs 1-3 are read at S1230. The package ID of the read records is updated at S1240 as described above and illustrated in FIG. 13. Next, a transaction queue record is created at S1250. The record associates the source table of the staging table with the updated package ID and the status "open". FIG. 14 illustrates transaction queue 500 after creation of such a record according to the present example.

While maintaining the read lock, flow returns to S1230 to read records associated with package ID=0 and not having identical key values to records which are associated with non-zero package IDs. Continuing the present example, the record associated with sequence ID=5 is read and its package ID is updated to package ID=2 as shown in FIG. 15. A corresponding transaction queue record is created at S1250, as depicted in FIG. 16.

Flow again returns to S1230, at which point no qualifying records remain to be read from staging table 200. Flow therefore continues to S1260, at which point the read lock is released.

A next consumer job (or, in some instances, the same consumer job) executing process 1200 then determines, at S1210, that the transaction queue includes at least one record associated with a package having a status of "open". The status of one package is changed to "in-process" at S1270 and the records of staging table 200 associated with the package are read at S1280. It should be noted that more than one consumer job may read the staging table simultaneously, since each consumer job only reads the records of the package it is processing. Once the records have been successfully processed, the read records are deleted from the staging table and the corresponding record is deleted from the transaction queue at S1290.

Figure 17:
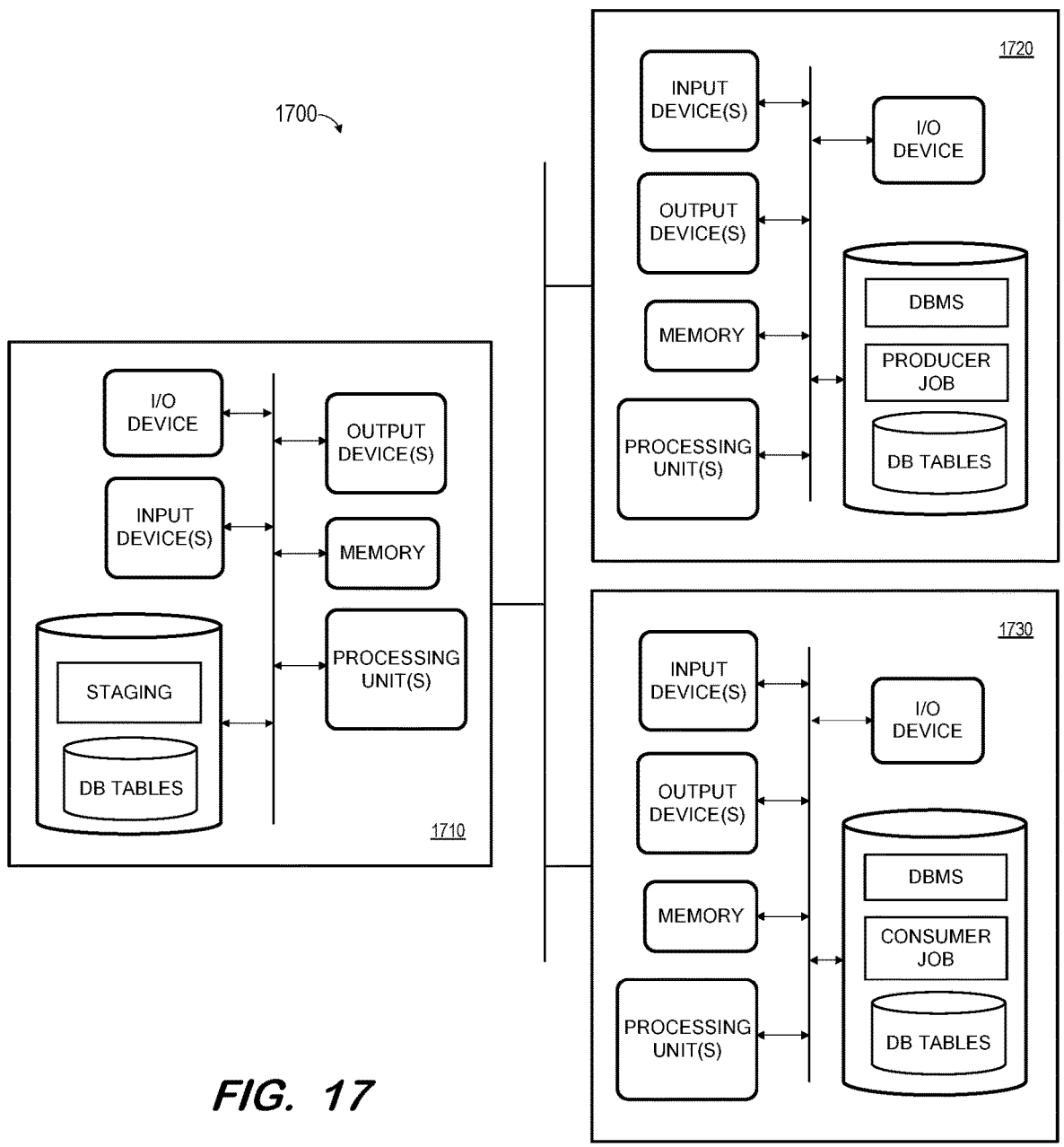
FIG. 17 is a block diagram of computing devices comprising a system architecture according to some embodiments.

FIG. 17 is a block diagram of system 1700 according to some embodiments. System 1700 includes staging system 1710, which may comprise an implementation of staging system 110. Staging system 1710 may be distributed from source system 1720 and communicate with source system 1720 via remote function calls. Source system 1720 may comprise an implementation of source system 120 and target system 1730 may comprise an implementation of target system 130. According to some embodiments, staging system 1710 may communicate simultaneously with many source systems and target systems to perform replication of database objects as described herein. Each of systems 1710, 1720 and 1730 may comprise a general-purpose computing apparatus and may execute program code using processing unit(s) to perform any of the functions described herein. Each of systems 1710, 1720 and 1730 may include other unshown elements according to some embodiments.

All data storage mentioned herein may be provided via combinations of magnetic storage devices (e.g., hard disk drives and flash memory), optical storage devices, Read Only Memory (ROM) devices, etc., while volatile memory may comprise Random Access Memory (RAM), Storage Class Memory (SCM) or any other fast-access memory.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system to perform parallel reads of records of a data staging table, each record of the data staging table associated with a package identifier, a key value of a record of a first database table, values of one or more non-key fields of the record of the first database table, and a database operation, comprising:
    a memory storing processor-executable program code;
    a processing unit to execute the processor-executable program code to cause the system to:
    read two or more records of the data staging table in parallel, each of the read one or more records associated with a package identifier indicating a particular record is not being processed, and not including a same key value as any other record of the data staging table associated with a package identifier indicating the particular record is being processed, each of the two or more records being associated with a sequence identifier, the sequence identifier for a first record indicating a temporal order of a first data change associated with the first record relative to at least a second data change associated with a second record of the two or more records;
    update the package identifier of each of the read records of the data staging table to a first package identifier indicating that the particular record is being processed;
    create a transaction record of a transaction queue associating the data staging table and the first package identifier;
    determine that the read two or more records have been processed; and
    in response to the determination, delete the one or more read rows from the data staging table and the transaction record.

2. A system according to claim 1, the processing unit to execute the processor-executable program code to cause the system to:
    set a read lock on the data staging table prior to reading the two or more records; and
    remove the read lock after updating the package identifier and before determining that the read two or more records have been processed.

3. A system according to claim 1, wherein updating the package identifier comprises determining a largest package identifier of the transaction queue and incrementing the largest package identifier to generate the first package identifier.

4. A system according to claim 1, wherein the package identifier indicating the particular record is not being processed is zero.

5. A system according to claim 1, the processing unit to execute the processor-executable program code to cause the system to:
    prior to the determination that the read two or more records have been processed:
    read second records of the data staging table, each of the second read records being associated with the package identifier indicating that a second particular record is not being processed, and not including a same key value as any other record of the data staging table associated with a package identifier indicating the record is being processed;
    update the package identifier of each of the second read records of the data staging table to a second package identifier indicating that the second particular record is being processed; and
    create a second transaction record of a transaction queue associating the data staging table and the second package identifier.

6. A system according to claim 5, the processing unit to execute the processor-executable program code to cause the system to:
    determine that the read second records have been processed; and
    in response to the determination that the read second records have been processed, delete the second one or more read rows from the data staging table and the second transaction record.

7. A computer-implemented method for performing parallel reads of records of a data staging table, each record of the data staging table associated with a package identifier, a key value of a record of a first database table, values of one or more non-key fields of the record of the first database table, and a database operation, the method comprising:
    reading two or more records of the data staging table in parallel, each of the read one or more records associated with a package identifier indicating a particular record is not being processed, and not including a same key value as any other record of the data staging table associated with a package identifier indicating the particular record is being processed, each of the two or more records being associated with a sequence identifier, the sequence identifier for a first record indicating a temporal order of a first data change associated with the first record relative to at least a second data change associated with a second record of the two or more records;

updating the package identifier of each of the read records of the data staging table to a first package identifier indicating that the particular record is being processed;

creating a transaction record of a transaction queue associating the data staging table and the first package identifier;

determining that the read two or more records have been processed; and in response to the determination, delete the one or more read rows from the data staging table and the transaction record.

8. A method according to claim 7, further comprising:
setting a read lock on the data staging table prior to reading the two or more records; and
removing the read lock after updating the package identifier and before determining that the read two or more records have been processed.

9. A method according to claim 7, wherein updating the package identifier comprises determining a largest package identifier of the transaction queue and incrementing the largest package identifier to generate the first package identifier.

10. A method according to claim 7, wherein the package identifier indicating the particular record is not being processed is zero.

11. A method according to claim 7, further comprising:
prior to the determination that the read two or more records have been processed:
reading second records of the data staging table, each of the second read records being associated with the package identifier indicating that a second particular record is not being processed, and not including a same key value as any other record of the data staging table associated with a package identifier indicating the record is being processed;
updating the package identifier of each of the second read records of the data staging table to a second package identifier indicating that the record is being processed; and
creating a second transaction record of a transaction queue associating the data staging table and the second package identifier.

12. A method according to claim 11, further comprising:
determining that the read second records have been processed; and
in response to the determination that the read second records have been processed, deleting the second one or more read rows from the data staging table and the second transaction record.

13. A non-transitory computer-readable medium storing program code executable by a processing unit of a computing system to cause the computing system to:
read two or more records of a data staging table in parallel, each record of the data staging table associated with a package identifier, a key value of a particular record of a first database table, values of one or more non-key fields of the particular record of the first database table, and a database operation, where each of the read two or more records is associated with a package identifier indicating the particular record is not being processed, and does not include a same key value as any other record of the data staging table which is associated with a package identifier indicating the particular record is being processed, each of the two or more records being associated with a sequence identifier, the sequence identifier for a first record indicating a temporal order of a first data change associated with the first record relative to at least a second data change associated with a second record of the two or more records;

update the package identifier of each of the read records of the data staging table to a first package identifier indicating that the particular record is being processed;

create a transaction record of a transaction queue associating the data staging table and the first package identifier;

determine that the read two or more records have been processed; and in response to the determination, delete the one or more read rows from the data staging table and the transaction record.

14. A medium according to claim 13, the program code executable by a processing unit of a computing system to cause the computing system to:
set a read lock on the data staging table prior to reading the two or more records; and
remove the read lock after updating the package identifier and before determining that the read two or more records have been processed.

15. A medium according to claim 13, wherein updating the package identifier comprises determining a largest package identifier of the transaction queue and incrementing the largest package identifier to generate the first package identifier.

16. A medium according to claim 13, wherein the package identifier indicating the particular record is not being processed is zero.

17. A medium according to claim 13, the program code executable by a processing unit of a computing system to cause the computing system to:
prior to the determination that the read one or more records have been processed:
read second records of the data staging table, each of the second read records being associated with the package identifier indicating that a second particular record is not being processed, and not including a same key value as any other record of the data staging table associated with a package identifier indicating the record is being processed;
update the package identifier of each of the second read records of the data staging table to a second package identifier indicating that the record is being processed; and
create a second transaction record of a transaction queue associating the data staging table and the second package identifier.

18. A medium according to claim 17, the program code executable by a processing unit of a computing system to cause the computing system to:
determine that the read second records have been processed; and in response to the determination that the read second records have been processed, delete the second one or more read rows from the data staging table and the second transaction record.

\* \* \* \* \*